US009871768B1

(12) United States Patent
Ray et al.

(10) Patent No.: US 9,871,768 B1
(45) Date of Patent: *Jan. 16, 2018

(54) IPV6 TO IPV4 DATA PACKET MIGRATION IN A TRUSTED SECURITY ZONE

(71) Applicant: Sprint Communications Company L.P., Overland Park, KS (US)

(72) Inventors: Amar N. Ray, Shawnee, KS (US); James P. Sisul, Overland Park, KS (US)

(73) Assignee: Spring Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/602,057

(22) Filed: May 22, 2017

Related U.S. Application Data

(63) Continuation of application No. 14/793,344, filed on Jul. 7, 2015, now Pat. No. 9,686,240.

(51) Int. Cl.
*H04L 12/28* (2006.01)
*H04L 29/06* (2006.01)
*H04L 12/725* (2013.01)
*H04L 12/749* (2013.01)

(52) U.S. Cl.
CPC ............ *H04L 63/04* (2013.01); *H04L 45/306* (2013.01); *H04L 45/741* (2013.01); *H04L 69/18* (2013.01)

(58) Field of Classification Search
None
See application file for complete search history.

(56) References Cited

U.S. PATENT DOCUMENTS

| 5,928,363 | A  | 7/1999  | Ruvolo |
| 5,983,350 | A  | 11/1999 | Minear et al. |
| 6,775,772 | B1 | 8/2004  | Binding et al. |
| 7,305,712 | B2 | 12/2007 | Watt et al. |
| 7,325,083 | B2 | 1/2008  | Watt et al. |
| 7,340,573 | B2 | 3/2008  | Watt |
| 7,370,210 | B2 | 5/2008  | Symes |
| 7,661,104 | B2 | 2/2010  | Watt et al. |
| 7,702,951 | B2 | 4/2010  | Yamamoto et al. |
| 7,849,296 | B2 | 12/2010 | Watt et al. |
| 8,090,797 | B2 | 1/2012  | Chinta et al. |
| 8,171,483 | B2 | 5/2012  | Nord et al. |
| 8,271,976 | B2 | 9/2012  | Vega et al. |
| 8,280,944 | B2 | 10/2012 | Laadan et al. |
| 8,443,230 | B1 | 5/2013  | James-Roxby et al. |

(Continued)

FOREIGN PATENT DOCUMENTS

| WO | WO2015039699 A1 | 3/2015 |
| WO | WO2016102297 A1 | 6/2016 |
| WO | WO2017062101 A1 | 4/2017 |

OTHER PUBLICATIONS

Notice of Allowance dated Oct. 5, 2016, U.S. Appl. No. 14/746,615, filed Jun. 22, 2015.

(Continued)

*Primary Examiner* — Otis L Thompson, Jr.

(57) ABSTRACT

Systems and methods discussed herein relate to enabling communications between IPv4 and IPv6 hosts using a communication channel in a trusted security zone associated with a first host to determine the IP-versions and/or other security features that may be present or enabled on the first host or the second host.

20 Claims, 9 Drawing Sheets

(56) References Cited

U.S. PATENT DOCUMENTS

| | | |
|---|---|---|
| 8,649,770 B1 | 2/2014 | Cope et al. |
| 8,712,407 B1 | 4/2014 | Cope et al. |
| 8,797,875 B2 | 8/2014 | Garcia Martin et al. |
| 8,842,578 B1 | 9/2014 | Zisapel et al. |
| 8,935,318 B1 | 1/2015 | Konerding et al. |
| 8,984,110 B1 | 3/2015 | Asveren |
| 8,996,644 B2 | 3/2015 | Pope |
| 9,047,441 B2 | 6/2015 | Xie et al. |
| 9,104,836 B2 | 8/2015 | Burstein et al. |
| 9,161,227 B1 | 10/2015 | Bye et al. |
| 9,183,606 B1 | 11/2015 | Paczkowski et al. |
| 9,191,865 B1 | 11/2015 | Paczkowski et al. |
| 9,230,085 B1 | 1/2016 | Paczkowski et al. |
| 9,237,084 B2 | 1/2016 | Chapman |
| 9,274,974 B1 | 3/2016 | Chen et al. |
| 9,282,898 B2 | 3/2016 | McRoberts et al. |
| 9,288,148 B1 | 3/2016 | Krishnaswamy et al. |
| 9,298,515 B2 | 3/2016 | McMurry et al. |
| 9,324,016 B1 | 4/2016 | Cordes et al. |
| 9,374,363 B1 | 6/2016 | Paczkowski et al. |
| 9,384,028 B1 | 7/2016 | Felstaine et al. |
| 9,392,446 B1 | 7/2016 | Paczkowski et al. |
| 9,396,016 B1 | 7/2016 | Marquardt et al. |
| 9,407,612 B2 | 8/2016 | Sood et al. |
| 9,450,866 B2 | 9/2016 | He et al. |
| 9,460,286 B1 | 10/2016 | Felstaine et al. |
| 9,503,363 B2 | 11/2016 | Sivabalan et al. |
| 9,509,587 B1 | 11/2016 | Marquardt et al. |
| 9,519,563 B2 | 12/2016 | Manghirmalani et al. |
| 9,537,741 B2 | 1/2017 | Chakrabarti et al. |
| 9,549,321 B2 | 1/2017 | Slavov et al. |
| 9,565,168 B1 | 2/2017 | Marquardt et al. |
| 9,578,664 B1 | 2/2017 | Paczkowski et al. |
| 9,613,190 B2 | 4/2017 | Ford et al. |
| 9,686,240 B1 | 6/2017 | Ray et al. |
| 9,749,294 B1 | 8/2017 | Marquardt et al. |
| 9,769,854 B1 | 9/2017 | Paczkowski et al. |
| 9,781,016 B1 | 10/2017 | Marquardt et al. |
| 2002/0091650 A1 | 7/2002 | Ellis |
| 2002/0107958 A1 | 8/2002 | Faraldo |
| 2003/0177387 A1 | 9/2003 | Osterwalder et al. |
| 2004/0139352 A1 | 7/2004 | Shewchuk et al. |
| 2004/0177269 A1 | 9/2004 | Belnet et al. |
| 2004/0181682 A1 | 9/2004 | Orino et al. |
| 2004/0187117 A1 | 9/2004 | Orion et al. |
| 2004/0240468 A1 | 12/2004 | Chin et al. |
| 2004/0260910 A1 | 12/2004 | Watt et al. |
| 2005/0068981 A1* | 3/2005 | Park ............... H04L 69/16 370/466 |
| 2005/0102603 A1 | 5/2005 | Tapper et al. |
| 2005/0114616 A1 | 5/2005 | Tune et al. |
| 2005/0138421 A1 | 6/2005 | Fedronic et al. |
| 2005/0160210 A1 | 7/2005 | Watt et al. |
| 2005/0185672 A1 | 8/2005 | Endo et al. |
| 2005/0261985 A1 | 11/2005 | Miller et al. |
| 2006/0146767 A1 | 7/2006 | Moganti |
| 2006/0190614 A1 | 8/2006 | Altman et al. |
| 2006/0253701 A1 | 11/2006 | Kim et al. |
| 2006/0259641 A1* | 11/2006 | Kim ............... H04L 69/16 709/245 |
| 2007/0174253 A1 | 7/2007 | Hodnett et al. |
| 2007/0282572 A1 | 12/2007 | Larus |
| 2008/0020745 A1 | 1/2008 | Bae et al. |
| 2008/0162877 A1 | 7/2008 | Altman et al. |
| 2008/0165259 A1 | 7/2008 | Nobels |
| 2008/0189468 A1 | 8/2008 | Schmidt et al. |
| 2008/0301779 A1 | 12/2008 | Garg et al. |
| 2009/0007100 A1 | 1/2009 | Field et al. |
| 2009/0199177 A1 | 8/2009 | Edwards et al. |
| 2009/0241108 A1 | 9/2009 | Edwards et al. |
| 2009/0254984 A1* | 10/2009 | Nice ............... H04L 63/0485 726/11 |
| 2009/0300605 A1 | 12/2009 | Edwards et al. |
| 2009/0320048 A1 | 12/2009 | Watt et al. |
| 2010/0103837 A1* | 4/2010 | Jungck ............... H04L 29/12066 370/252 |
| 2010/0106568 A1 | 4/2010 | Grimes |
| 2010/0192230 A1 | 7/2010 | Steeves et al. |
| 2011/0119748 A1 | 5/2011 | Edwards et al. |
| 2011/0173443 A1 | 7/2011 | Osterwalder et al. |
| 2012/0040662 A1 | 2/2012 | Rahman et al. |
| 2012/0117379 A1* | 5/2012 | Thornewell ....... H04L 29/12066 713/155 |
| 2012/0304244 A1 | 11/2012 | Xie et al. |
| 2012/0331550 A1 | 12/2012 | Raj et al. |
| 2013/0055256 A1 | 2/2013 | Banga et al. |
| 2013/0070745 A1* | 3/2013 | Nixon ............... H04L 45/74 370/338 |
| 2013/0091568 A1 | 4/2013 | Sharif et al. |
| 2013/0160139 A1 | 6/2013 | Goel et al. |
| 2013/0305333 A1 | 11/2013 | Katzer et al. |
| 2013/0333008 A1 | 12/2013 | Tapling et al. |
| 2013/0345530 A1 | 12/2013 | McRoberts et al. |
| 2014/0013327 A1 | 1/2014 | Sherwood et al. |
| 2014/0033316 A1 | 1/2014 | Paczkowski et al. |
| 2014/0047548 A1 | 2/2014 | Bye et al. |
| 2014/0052922 A1 | 2/2014 | Moyer et al. |
| 2014/0053003 A1 | 2/2014 | Moyer et al. |
| 2014/0075567 A1 | 3/2014 | Raleigh et al. |
| 2014/0201374 A1 | 7/2014 | Ashwood-Smith et al. |
| 2014/0229945 A1 | 8/2014 | Barkai et al. |
| 2014/0241247 A1 | 8/2014 | Kempf et al. |
| 2014/0259115 A1 | 9/2014 | Bakshi et al. |
| 2014/0281529 A1 | 9/2014 | Epp et al. |
| 2014/0281544 A1 | 9/2014 | Paczkowski et al. |
| 2014/0298477 A1 | 10/2014 | Castro et al. |
| 2014/0304803 A1 | 10/2014 | Pope et al. |
| 2014/0325681 A1 | 10/2014 | Kleidermacher et al. |
| 2014/0337940 A1 | 11/2014 | Slavov et al. |
| 2014/0344912 A1 | 11/2014 | Chapman et al. |
| 2014/0373012 A1 | 12/2014 | Ylitalo et al. |
| 2015/0046676 A1 | 2/2015 | Archibald et al. |
| 2015/0072726 A1 | 3/2015 | Stern |
| 2015/0074745 A1 | 3/2015 | Stern et al. |
| 2015/0074764 A1 | 3/2015 | Stern |
| 2015/0089246 A1 | 3/2015 | Kanai et al. |
| 2015/0117409 A1 | 4/2015 | Ghai |
| 2015/0117455 A1 | 4/2015 | Umesh et al. |
| 2015/0180730 A1 | 6/2015 | Felstaine et al. |
| 2015/0195281 A1 | 7/2015 | Venkataramu et al. |
| 2015/0220937 A1 | 8/2015 | Iannace et al. |
| 2015/0244717 A1 | 8/2015 | Jin et al. |
| 2015/0248283 A1 | 9/2015 | Gschwind et al. |
| 2015/0248554 A1 | 9/2015 | Dumitru et al. |
| 2015/0358248 A1 | 12/2015 | Saha et al. |
| 2015/0365352 A1 | 12/2015 | Xiang |
| 2015/0370704 A1 | 12/2015 | Kato |
| 2015/0373050 A1 | 12/2015 | Dayan et al. |
| 2015/0381423 A1 | 12/2015 | Xiang |
| 2016/0043944 A1 | 2/2016 | Felstaine et al. |
| 2016/0057102 A1 | 2/2016 | Wei et al. |
| 2016/0057788 A1 | 2/2016 | Sharma et al. |
| 2016/0073283 A1 | 3/2016 | Grayson et al. |
| 2016/0080323 A1 | 3/2016 | MacKay et al. |
| 2016/0094573 A1 | 3/2016 | Sood et al. |
| 2016/0127333 A1 | 5/2016 | Sood et al. |
| 2016/0142396 A1 | 5/2016 | McRoberts et al. |
| 2016/0149748 A1* | 5/2016 | Pan ............... H04L 61/251 370/389 |
| 2016/0149921 A1 | 5/2016 | Potlapally et al. |
| 2016/0157084 A1 | 6/2016 | Tsubouchi |
| 2016/0170848 A1 | 6/2016 | Yang et al. |
| 2016/0180089 A1 | 6/2016 | Dalcher |
| 2016/0182567 A1 | 6/2016 | Sood et al. |
| 2016/0205004 A1 | 7/2016 | Chou et al. |
| 2016/0212016 A1 | 7/2016 | Vrzic et al. |
| 2016/0212620 A1 | 7/2016 | Paczkowski et al. |
| 2016/0219076 A1 | 7/2016 | Paczkowski et al. |
| 2016/0226663 A1 | 8/2016 | Jones et al. |
| 2016/0226912 A1 | 8/2016 | Clark et al. |
| 2016/0226913 A1 | 8/2016 | Sood et al. |
| 2016/0234725 A1 | 8/2016 | Paczkowski et al. |
| 2016/0323200 A1 | 11/2016 | Xiang et al. |

(56) References Cited

U.S. PATENT DOCUMENTS

| | | | |
|---|---|---|---|
| 2016/0337329 A1 | 11/2016 | Sood et al. |
| 2016/0350150 A1 | 12/2016 | Marquardt et al. |
| 2016/0352537 A1 | 12/2016 | Marquardt et al. |
| 2016/0366123 A1 | 12/2016 | Smith et al. |
| 2016/0373474 A1 | 12/2016 | Sood et al. |
| 2016/0378685 A1 | 12/2016 | Spurlock et al. |
| 2017/0005990 A1 | 1/2017 | Birger et al. |
| 2017/0012968 A1 | 1/2017 | Feng et al. |
| 2017/0012975 A1 | 1/2017 | Ilyadis et al. |
| 2017/0093806 A1 | 3/2017 | Phegade et al. |
| 2017/0102957 A1 | 4/2017 | Marquardt et al. |
| 2017/0142024 A1 | 5/2017 | Fromentoux et al. |

OTHER PUBLICATIONS

Notice of Allowance dated May 12, 2017, U.S. Appl. No. 15/403,166, filed Jan. 10, 2017.

FAIPP Pre-Interview Communication dated Jul. 25, 2016, U.S. Appl. No. 14/703,885, filed May 5, 2015.

Notice of Allowance dated Sep. 20, 2016, U.S. Appl. No. 14/703,885, filed May 5, 2015.

FAIPP Pre-Interview Communication dated Feb. 7, 2017, U.S. Appl. No. 14/847,992, filed Sep. 8, 2015.

Notice of Allowance dated Apr. 25, 2017, U.S. Appl. No. 14/847,992, filed Sep. 8, 2015.

FAIPP Pre-Interview Communication dated Mar. 9, 2017, U.S. Appl. No. 14/930,146, filed Nov. 2, 2015.

Notice of Allowance dated May 26, 2017, U.S. Appl. No. 14/930,146, filed Nov. 2, 2015.

FAIPP Pre-Interview Communication dated Apr. 20, 2017, U.S. Appl. No. 14/879,324, filed Oct. 9, 2015.

Notice of Allowance dated Jul. 3, 2017, U.S. Appl. No. 14/879,324, filed Oct. 9, 2015.

Notice of Allowance dated Nov. 21, 2017, U.S. Appl. No. 14/793,344, filed Jul. 7, 2015.

Network Functions Virtualisation, "An Introduction, Benefits, Enablers, Challenges & Call for Action," Oct. 22-24, 2012, "SDN an OpenFlow World Congress," Darmstadt-Germany.

Network Functions Virtualisation, "Network Operator Perspectives on Industry Progress," Oct. 14-17, 2012, "SDN an OpenFlow World Congress," Darmstadt-Germany.

Foreign Communication from a Related Counterpart—International Search Report and Written Opinion dated Oct. 21, 2016, filed on Aug. 11, 2016, International Application No. PCT/US2016/046648.

Hwang, Jinho, et al., entitled, "NetVM: High Performance and Flexible Networking Using Virtualization on Commodity Platforms," 11th USENIX Symposium on Networked Systems Design and Implementation (NSDI '14); Apr. 2-5, 2014, Seattle WA, US, ISBN 978-1-931971-09-06.

Marquardt, Ronald R., et al., "System and Method of Establishing Trusted Operability Between Networks in a Network Functions Virtualization Environment," filed Sep. 8, 2015, U.S. Appl. No. 14/847,992.

Marquardt, Ronald R., et al., "Dynamic Addition of Network Function Services," filed Nov. 2, 2015, U.S. Appl. No. 14/930,146.

Marquardt, Ronald R., et al., "Support Systems Interactions with Virtual Network Functions in a Trusted Security Zone," filed on Oct. 9, 2015, U.S. Appl. No. 14/879,324.

Marquardt, Ronald R., et al., "Securing Communication in a Network Function Virtualization (NFV) Core Network," filed on Oct. 1, 2015, U.S. Appl. No. 14/872,936.

Bales, Mark R., et al., "Session Aggregator Brokering of Data Stream Communication," filed on Oct. 3, 2016, U.S. Appl. No. 15/284,506.

FAIPP Pre-Interview Communication dated Oct. 19, 2017, U.S. Appl. No. 14/872,936, filed on Oct. 1, 2015.

Office Action dated Jul. 24, 2017, U.S. Appl. No. 14/879,327, filed on Oct. 9, 2015.

Marquardt, Ronald R., et al., "System and Method of Establishing Trusted Operability Between Networks in a Network Functions Virtualization Environment," filed Jul. 20, 2017, U.S. Appl. No. 15/655,080.

Marquardt, Ronald R., et al., "Dynamic Addition of Network Function Services," filed on Aug. 25, 2017, U.S. Appl. No. 15/686,324.

\* cited by examiner

IPV6 TO IPV4 DATA PACKET MIGRATION IN A TRUSTED SECURITY ZONE

CROSS-REFERENCE TO RELATED APPLICATIONS

This application claims priority as a continuation application to U.S. patent application Ser. No. 14/793,344 filed on Jul. 7, 2015, entitled "IPv6 to IPv4 Data Packet Migration in a Trusted Security Zone" by Amar N. Ray, et al., which is herein incorporated by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The "Internet Protocol" (IP) is a well-known standardized method of network layer communication between devices, servers, and other points of origin over the Internet. The data transferred may be divided into data packets, each of which comprise header information indicating a plurality of information including the packet's source and destination, as well as restoration/reassembly instructions for that the data packets can be restored to an original form once they arrive at the destination. The Internet Protocol IPv4 has been in use since the early 1980s, and the protocol, IPv6, was created in part to define an expanded IP address range in response to the increasing demand for IP addresses. In some embodiments, IPv6 may be associated with applications and/or networks that may communicate with applications and networks associated with IPv4. This may be referred to as "coexistence." Coexistence may be a challenge because of the non-obvious impacts on hardware design, and, as discussed below, various methods may be used to accommodate this coexistence.

SUMMARY

In an embodiment, a system for the secure transmission of information between IPv4 and IPv6 nodes, comprising: a processor stored on a first device; a non-transitory memory stored on the first device; an application stored on the first device, wherein the first device is in communication with a network and comprises a trusted security zone, wherein the trusted security zone comprises a communications channel to establish an end-to-end trusted communication link. The embodiment further comprising wherein the communications channel is configured to: receive a request from a first application associated with the first device, wherein the request is to engage in an exchange of communication with a second application, wherein the first application is associated with an IPv6 protocol, and wherein the second application is associated with a second device; determine if the second application is associated with an IPv6 protocol. The embodiment further comprising the communications channel, in response to a determination that the second application is not associated with the IPv6 protocol, determine if the second application is associated with an IPv4 protocol and whether the IPv4 protocol comprises an active security feature; and in response to a determination that the second application is associated with an IPv4 protocol comprising the active security feature, sends an IPv6 protocol packet to one of the second application or the second device to migrate the second application to the IPv6 protocol.

A system for the secure transmission of information between IPv4 and IPv6, comprising: a processor stored on a first device; a non-transitory memory stored on the first device; an application stored on the first device, wherein the first device is in communication with a network and comprises a trusted security zone, wherein the trusted security zone comprises a communications channel to establish an end-to-end trusted communication link. In this embodiment, the communications channel is further configured to: receive a request from a first application associated with the first device, wherein the request is to engage in an exchange of communication with a second application, wherein the second application is associated with a second device, and wherein the second device is in communication with the network; and determine if the second application is associated with an IPv6 protocol. The embodiment further comprising the communication channel, in response to the determination whether the second application is associated with the IPv6 protocol, determining whether the second application is associated with an IPv4 protocol and has IPsec activated; and the communication channel, in response to a determination that the second application either is not associated with an IPv4 protocol or does not have IPsec activated, determining whether the second application is at least one of a trusted application or is stored in a secure environment of the second device. The embodiment further comprising the communications channel, in response to at least one of a determination that the second application is associated with IPv4 protocol and comprises activated IPsec and a determination that the second application is at least one of a trusted application or is stored in the secure environment of the second device, sending an IPv6 packet to the second application via the end-to-end trusted communication link, wherein the communications channel further comprises a conversion engine, wherein the conversion engine is configured to one of translate, encrypt, or encapsulate the IPv6 packet.

In an embodiment, a method for secure migration of IPv6 protocol packets, comprising: determining, by a communications channel stored in a trusted security zone of a first device, an IP protocol version associated with a first application stored on a first device, and an IP protocol version associated with a second application stored on a second device. The embodiment further comprising: the communications channel, in response to a determination that first application is associated with an IPv6 protocol and that the second application is associated with an IPv4 protocol, determining if the IPv4 protocol comprises a security feature and whether the security feature is activated; and at least one of: establishing, by the communications channel, in response to a determination that the security feature is present and activated, an end-to-end trusted communication link, a communication, and determining, in response to a determination that the security feature is not present or is not activated, if the second application is a trusted application or resides in a secure environment of the second device. The embodiment further comprising: migrating, by the communications channel, in response to a determination that the second application is at least one of trusted application or resides in a secure environment of the second device, packet communication to the second application via the end-to-end trusted communication link; wherein migrating comprises at least one of encrypting, encapsulating, or translating the IPv6 packet to an IPv4 protocol in the communications channel.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
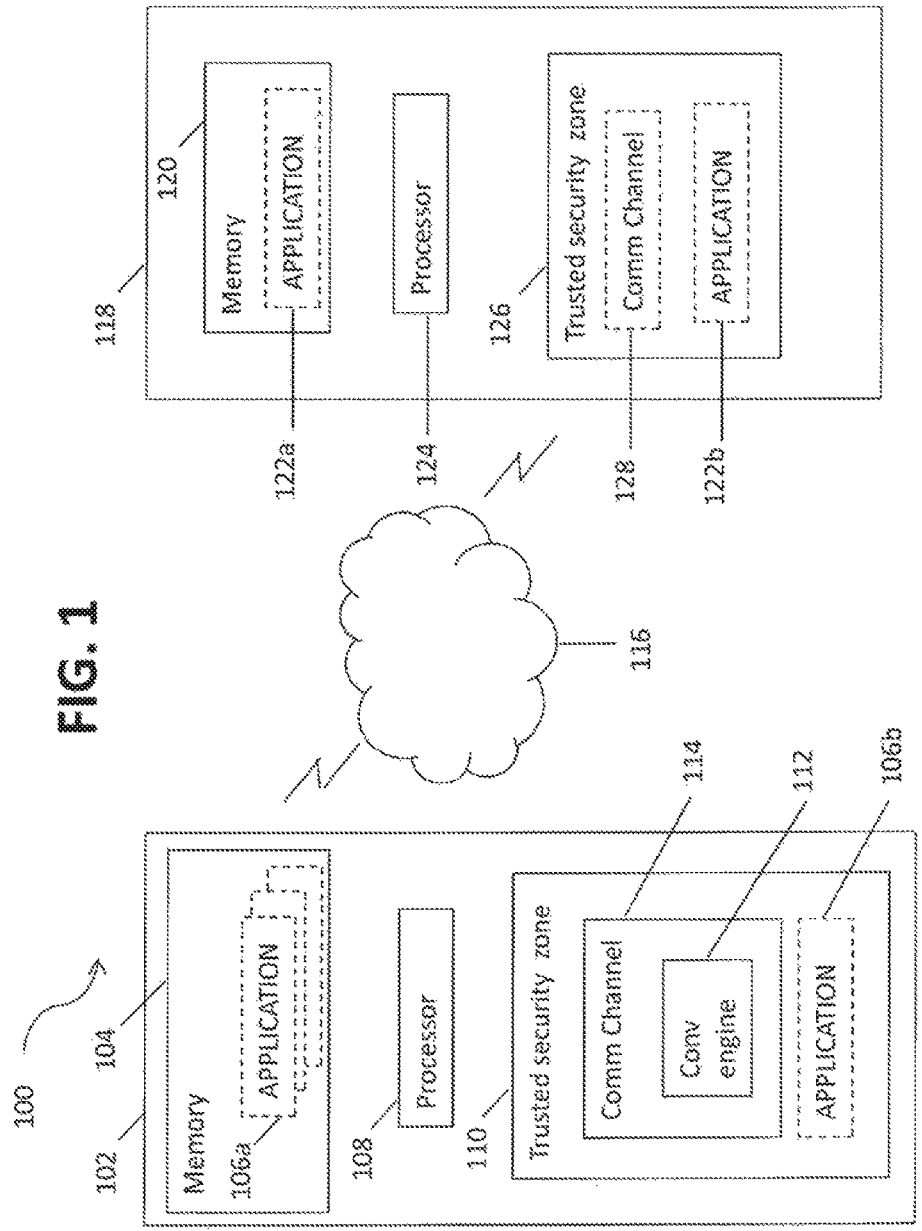
FIG. 1 is an illustration of a system that executes according to embodiments of the present disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The systems and methods disclosed herein relate to embodiments of establishing an end-to-end trusted communication link. In one embodiment, an originating device and a receiving device may communicate even if each is associated with a different IP version, or if the network over which communication is to be established is a different IP version than one or both of the originator or receiver, by way of a secure communications channel in a trusted security zone of at least one of the originating or receiving device. This secure communications channel is employed to mitigate the risk in migrating data packets between different versions of application systems, firmware, other software, or internet protocols, a process which may expose the originating and/or receiving devices to hacking or other corruption.

As used herein, the term "migrating" may comprise sending/transmitting, translating, or otherwise communicating a data packet associated with an IPv6 host and/or network to a host or through a network associated with IPv4, or vice-versa. In one example, the process of establishing communication between two hosts at least at the point in the communication path along multiple nodes where adjacent destinations (nodes) comprise different IPv-versions (e.g., IPv4 and IPv6) may expose one or both hosts to hacking or other corruption. As such, device security is improved if a communication is enabled between hosts associated with different versions of an internet protocol (IPv4 and IPv6) in a manner that does not expose the device on which the migration is taking place or on other devices involved in the migration. By establishing a secure hardware root of trust between a first and a second host communications are protected from spoofing, hacking, and leaks during migration. The "hosts" discussed herein, which may be referred to as devices or applications stored on devices, and may be referred to as an originator or originating host and a destination/receiver or a destination/receiving host. As used herein, applications, devices, hosts, and networks may be discussed interchangeably in some situations with respect to data migration. The IP-versions associated with the originator and the destination are evaluated in similar manners. In an embodiment, each host is evaluated at least by determining the IP-version of the originator and the destination, determining the location of the originator and the destination and the security features associated with one or both locations, and determining if and how to send communication(s) between the hosts.

In one embodiment, two hosts, devices, and/or networks can communicate in a trusted security zone via a secure communications channel, even if the two hosts, devices, and/or networks are associated with different IP protocols. For example, if one host is associated with an IPv4 protocol and the other is associated with an IPv6 protocol. In an embodiment, the secure communications channel may (1) determine if the second application (or host, or network associated with the second application or host) is a trusted application (running in a trusted security zone); (2) determine if the second application resides in a secure location (e.g., a memory partition other than the trusted security zone), (3) determine the version of an IP protocol associated with each of the first and the second applications; and (4) determine whether an IPv4 protocol, if employed, is associated with a destination that also comprises IPsec or another security feature.

In an embodiment, the secure communications channel may also make those determinations regarding the first application (the sending host/device/network) as well, in order to determine what IPvX (IPv4 or IPv6) is associated with each of the originating and destination points. Based upon at least some of these determinations, the secure communications channel can determine if the requested information can be transmitted/received and how the information may be transmitted/received. The manner in which a migration is conducted may present a security challenge because data can leak out during a migration, and the applications/hosts/networks/devices can be exposed to hacking, corruption, and spoofing. The three conventional ways of migrating data when there are different versions of internet protocols associated with at least one point (node) in the transmission path are by using dual stacks, tunneling, or address/protocol translation ("APT"). As such, the migration may be performed in the trusted security zone by way of the secure communications channel and/or the information for the migration may be sent in an encapsulated or encrypted manner to the second application or may be translated—all of which may occur in the secure communications channel (referred to herein as a "communications channel" or "channel") in the trusted security zone. As discussed herein, the communication may occur by any of those mechanisms. Depending upon the embodiment and the IP-versions associated with the originator and the destination, translation, encryption, and/or encapsulation of the IPv6 packet (or IPv4 packet depending upon the embodiment) may be performed in the secure communications channel in order to create the end-to-end trusted communication link.

In one embodiment, an application residing on a first device attempts to engage in communication with a second application residing on a second device. The two applications and/or devices may have associated Internet Protocol versions, as may a network over which the communication will take place. The applications and may be stored in areas (e.g., on hosts, networks) with varying security levels and associated protocols, such as IPsec. Internet Protocol Security (IPsec) is a protocol suite for securing Internet Protocol (IP) communications by authenticating and encrypting each data packet of a communication session. The device associated with the first application may (1) receive the request in a trusted security zone, for example, using a secure communications channel within the trusted security zone, (2) the channel may determine if the second application is a trusted application, (3) the channel may then determine if the second application, if not a trusted application, is stored in a secure partition/environment of the second device, application on the second device, network, or host, (4) the channel may then determine the protocol (IPv4 or IPv6) associated with the second device, network, host, or application on the device, (5) determine the version of the first device, network, host, or application on the device, (7) determine, if either the first or second device is associated with an IPv4 protocol, if a security feature such as IPsec is active, and (7) engage in the requested communication, or (8) encrypt, encapsulate, translate, or otherwise a data packet from IPv4 to IPv6 or vice-versa. In various embodiments, the order in which these determinations are made may vary as discussed herein.

In some embodiments, based upon these determinations and in some cases the method of migration (dual stack, tunneling, and address/protocol translation ("APT")), the channel may encrypt, translate, or encapsulate the information including performing a migration of the IPv6 protocol to the second application. In an embodiment where one application is in a trust zone and another is not, the channel may still be able to secure that translation by encapsulation, translation, or encryption to enable communication between the originator and the destination.

In an embodiment, a first application associated with a first user equipment (UE) sends a request to a channel in a trusted security zone to engage in an at least one communication with a second application stored on a second user equipment. This request may be referred to as a DNS request, which is a query sent by a Domain Name System (DNS) in order to determine the IP-version of a destination and an originating host/device/network. The DNS request may comprise a request to engage in an exchange of communication with a second UE, wherein the communication may be the first application sending information to the second application, or receiving information from the second application, or both, which includes the determination of the IP-version of the destination and the originating host/device/network. While a "second device" or "second UE" is discussed herein, it is appreciated that the second device or UE may be a portable communication device, a remote server, or another computer system that may be accessed over a telecommunications provider's network, public Wi-Fi, or other known method.

In an embodiment, the channel, on the device and in a trusted security zone, may determine that the first application is associated with an IPv6 protocol, for example because the network or host associated with the first application (originating location) is associated with IPv6. The channel may also determine if the second application (destination location) comprises an IPv6 protocol. If the channel determines that the second application is associated with (and/or comprises) IPv6, it may allow the request for engagement to be granted, and the subject communication to be sent to or received by the first application from the second application. This may be allowed because the network involved is also an IPv6 network, whereas in the case of an IPv4 network, a mechanism such as tunneling as discussed herein may be employed.

However, in an embodiment where the channel determines that the second application (or the host or network) is associated with a different protocol, such as IPv4, the channel may then determine if the IPv4 protocol is in a location that also comprises or can access a predetermined feature such as IPsec, and whether this predetermined feature is activated (active). If the channel determines that the predetermined feature is associated with the second application and is active, the requested information may be securely transmitted using the channel (e.g., in the trusted security zone). A secure transmission may be defined as one employing an end-to-end trusted communication link, so that the applications and other actors are not spoofed or hacked and so that there are no leaks during the migration. That is, during an unsecure communication, e.g., one outside of the channel/trust zone and/or one that has not been encrypted or otherwise protected not only may be spoofed and/or hacked, but may create openings (leaks) which further compromise the security of the application/device/host/network. As discussed herein, it is appreciated that a "secure transmission" may be an encrypted transmission, an encapsulated transmission, and/or a transmission taking place in a secure channel and/or a trusted security zone that is sent using the end-to-end trusted communication link.

In an alternate embodiment, a secure transmission may be sent to/received from the second application if the channel determines that the protocol associated with the second application is not IPv6 but is IPv4 with IPsec also available and active at the destination, or that the second application is a trusted application or that the second application resides in a secure location. As used herein, a "secure location" or a "secure environment" may be a location where an application is stored that comprises a security protocol or other protective measures that inhibit leaks during the migration. In another embodiment, if the channel determines that the second application comprises a protocol different first application, e.g., IPv4 instead of IPv6, and that the IPv4 protocol-associated application does not comprise a predetermined security feature (IPsec) or that IPsec is not active/activated, the requested information may be sent in an encrypted fashion. This encrypted information may be sent if the second application is a trusted application and/or if the second application resides in a secure location. In another embodiment, if the channel determines that the second application is not a trusted application and doesn't reside in a secure location, the request may not be fulfilled and the first application may receive a notification that the data will not be sent/received along with instructions as to how to proceed.

FIG. 1 is an illustration of a system 100 according to embodiments of the present disclosure. In the system 100, a first user equipment 102 (hereinafter the "first device") and a second device user equipment 118 (hereinafter the "second device" portable communication device), which may be in communication with the network 116. While a first device 102 and a second device 118 may be referred to herein as user equipment (UE), devices or portable electronic devices, in other embodiments, the first and the second devices 102 and 118 may comprise hosts, smart phones, etc., that may be associated with an IPv4 or IPv6 protocol. It is appreciated that any or all of the migration methods discussed herein, tunneling, dual stack, or APT, may be performed in a trusted security zone 110 and/or in the secure communications channel 114 discussed below.

The network 116 may be an IPv4 or an IPv6 network associated with either the first device 102, the second device 118, both, or neither (e.g., in a roaming or bandwidth-sharing embodiment). The first device 102 may comprise at least one memory 104 where all or part of a plurality of applications 106a may reside. The first device 102 may further comprise a processor 108 capable of executing some of all of the plurality of applications 106a and 106b as discussed below. The second device 118 may also comprise a processor 124 and communication channel 128. The first device 102 may further comprise a trusted security zone where an application 106b or part of an application 106b may reside which may be part of the plurality of applications 106a. The trusted security zone 110 may further comprise a secure services manager, a trusted services manager, and an application layer (not pictured) as well as a secure communications channel 114 (herein referred to as the "channel,") comprising a conversion engine 112. In some embodiments, the conversion engine 112 may enable the channel 114 to encrypt, translate, or encapsulate IPv6 and/or IPv4 packets, depending upon the migration type employed. In an embodiment, a base transceiver station (BTS) (not pictured) may be in communication with the network 116 and at least one of the first device 102 and the second device 118.

In an embodiment, the channel 114 resides in the trusted security zone 110 and comprises an environment through which requests from the applications 106a/106b may be received and analyzed to determine how to (or if to) establish communications between an originator and a destination over a network, any of which may be associated with an IPv4 or IPv6 protocol. In an embodiment, these requests may be associated with engagement with a second application 122a or 122b that may reside on a second device 118. The channel 114 may be configured to receive these requests, and identify the originating location (the first device 102) and the destination receiving entity, e.g., the second device 118, to determine the version of an IP protocol associated with at least the second application 122a or 122b (or in other embodiments, associated with the network 116 or the devices/other hosts 102 and 118), and in some embodiments to determine the version of IP protocol associated with the first application 106a or 106b.

Based upon a plurality of determinations made by the communications channel 114, including (1) the protocol version associated with the first application 106a/106b and the second application 122a/122b, (2) whether, if an IPv4 protocol is associated with the second application 122a/122b, security such as IPsec is present and active, (3) if the second application 122a/122b comprises IPv4 but without active IPsec is stored in a secure environment such as a trusted security zone 126 on the second device 118 such as the application 122b (it is appreciated that, much like 106a and 106b, the applications 122a and 122b may reside in whole or in part in the memory 120 or the trusted security zone 126), or (4) if the second application 122a/122b is a trusted application, either because it is located in a trusted security zone 126 or because it has previously communicated with the first application 106a/106b and may still be associated with IPv4 but may comprise a token or other authentication mechanism.

The conversion engine 112 may be employed to encrypt or encapsulate information if a remote destination (device) is determined to not be a trusted application. In some embodiments, the conversion engine 112 may be employed if it is determined that the remote destination (the second device 118 discussed below) is in a secure environment. Based upon at least some of these determinations, the channel 114 may engage in the requested communication and perform a secure migration from IPv4 to IPv6 for the second application 122a/122b, or may decline to engage in the requested communication. The migration may comprise an encrypted, encapsulated, or translated IPv4 packet to the second application 122a/122b, that is, the migration is intended to at least facilitate communications between IPv4 and IPv6 hosts, devices, networks, and nodes.

In some embodiments, if the communication request is granted by the channel 114, a token or other authentication element may be sent with the communication. This token may authorize the first 106a/106b and the second applications 122a/122b to engage in communications for a predetermined period of time, a predetermined number of exchange/communications, a predetermined type of communication (send/receive/both), a predetermined amount of data transfer (total), a predetermined amount of data transfer (per engagement/communication), or combinations thereof.

In an embodiment, the channel 114 receives a request from the first application 106a/106b to exchange in a communication with the second application 122a/122b. The channel 114 may then make a plurality of determinations in various orders depending upon the embodiment. These determinations may comprise (1) whether the second application 122a/122b comprises an IPv6 protocol or an IPv4 (protocol; (2) if the second application 122a/122b comprises an IPv4 protocol, whether the second application is also associated with a predetermined flag such as a security feature flag (IPsec), and whether that flag is on; and (3) whether the second application 122a/122b is located in a secure environment such as the second application 122b in the trusted security zone 126 on the second device 118, or whether the second application 122a/122b is a trusted application. An application may be determined to be a trusted application, for example, based upon previous communications/token or other factors and flags associated with the application that may be detected by the channel 114.

Figure 2:
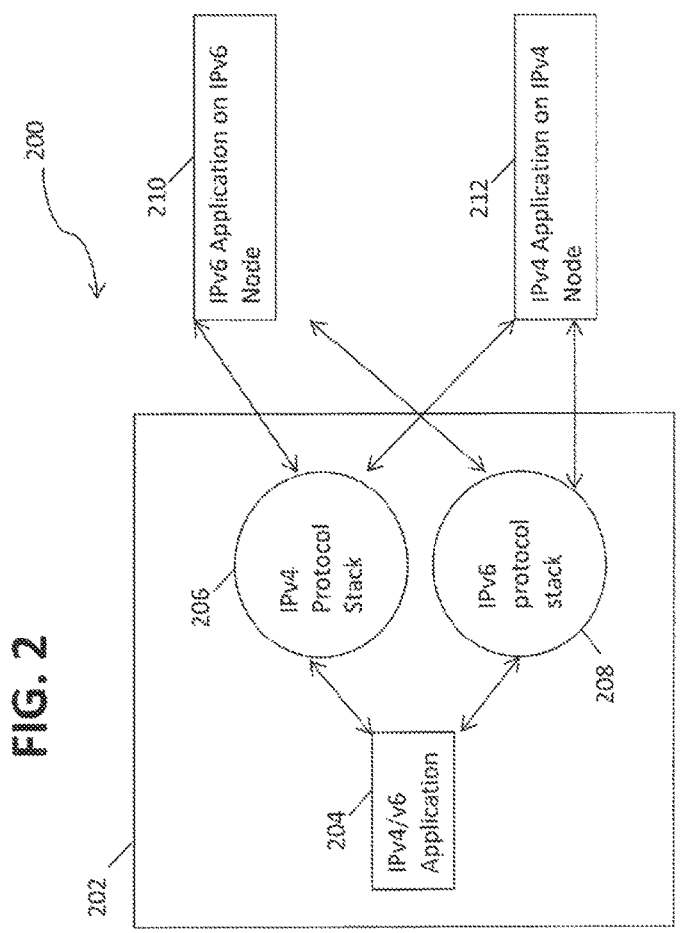
FIG. 2 illustrates an embodiment of a dual stack migration that may be operable according to embodiments of the present disclosure.

FIG. 2 illustrates an embodiment of a dual stack 200. A device with dual stack 200 capabilities has access to both IPv4 (206) and IPv6 (208) technology, and can use either/both versions to connect in parallel to both remote servers and other destinations. The IPv4/v6 dual stack node 202 may comprise an IPv4/v6 application 204, an IPv4 protocol stack 206, and an IPv6 protocol stack 208 that may be in communication with each other as well as with an IPv6 application on an IPv6 node 210, and an IPv4 application on an IPv4 node 212. In an embodiment, a client issues two DNS requests to connect to a server/remote location that may be associated with the IPv6 application on the IPv6 node 210 or the IPv4 application on the IPv4 node 212, e.g., if a portable electronic device or other UE desires to connect to a website. This request may pass through the IPv4/v6 application 204.

Figure 4:
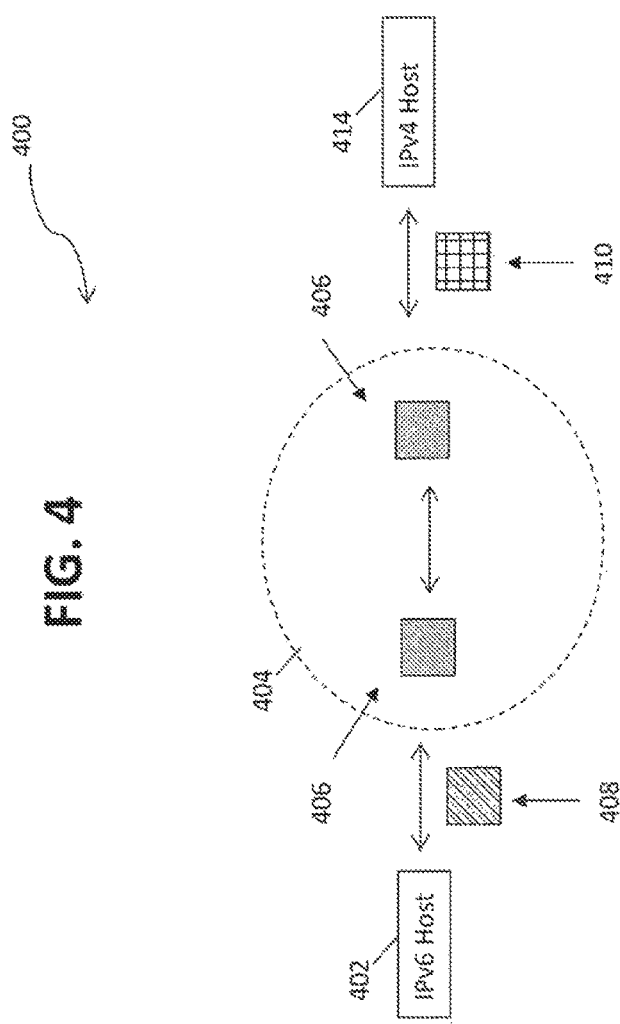
FIG. 4 illustrates an embodiment of an address protocol translation migration that may be operable according to embodiments of the present disclosure.

The channel, such as channel 114 in FIG. 4, may send a request to a remote server or application that may be an IPv6 Application on an IPv6 node 210, or an IPv4 Application on an IPv4 node 212. The request comprises both a request for IPv4 addresses and a request for IPv6 addresses from the remote locations 210 or 212. Based upon the response received by the client by way of the IPv4/v6 application 204, the client may follow a process based on an assumption that IPv6 is preferred over IPv4 because the dual stack is a transitional state, the goal of which is to transition to an IPv6-only network. The address (IPv6 or IPv4) returned to the client by way of the IPv4/v6 application 204 using the channel 114 and may then be used to connect to the remote locations 210 or 212. In an embodiment, if both an IPv6 and an IPv4 address are returned to the client, the IPv6 address will be used to connect to the remote location 210 (e.g., the website) and the IPv4 address may be used if the IPv6 address is used first unsuccessfully. In an embodiment, software defined networking (SDN) network interfaces communicate with each other directly inside the channel 114 via a shared memory, in contrast to the conventional use of external interfaces. Trusted security zone APIs may enable in and/or assist in migration through the channel 114, and if IPsec is determined to be off for the IPv4 node 212, the channel 114 may use predefined secure trusted security zone communication SPIs for the carry-over of the trust certificate from the IPv6 application on the IPv6 node 210 to the IPv4 application on the IPv4 node 212.

Figure 3:
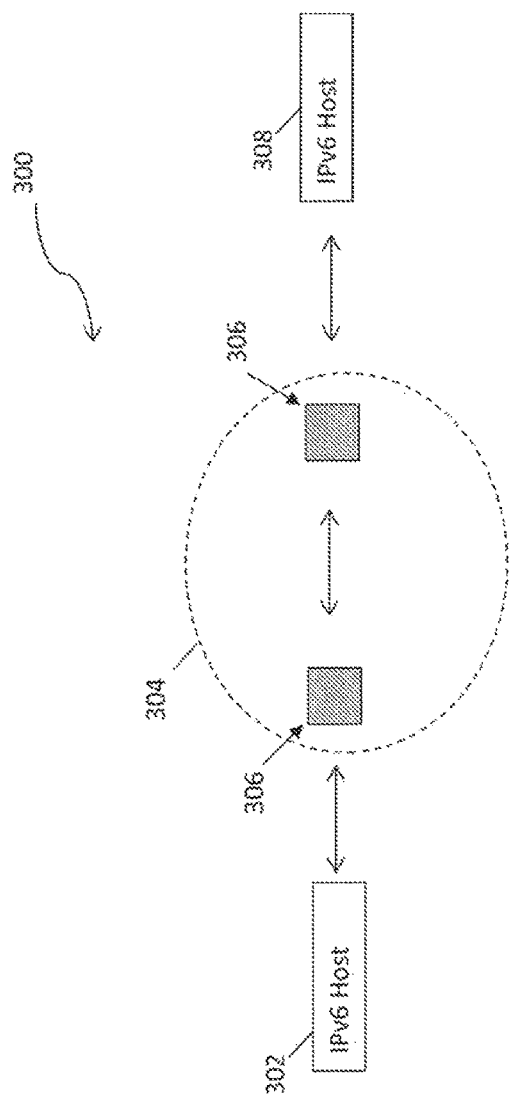
FIG. 3 illustrates an embodiment of a tunneling migration that may be operable according to embodiments of the present disclosure.

In some embodiments, telecommunications networks employ a tunneling protocol to preserve an underlying network, e.g., an IPv4 network, while enabling new network functions using IPv6. FIG. 3 is an illustration of tunneling mechanism 300. Tunneling may be employed to carry a payload such as an IPv6 packet 306 over an incompatible delivery network 304, or to provide a secure path through an untrusted network 304. The network 304 may comprise an IPv4 network 304 that may comprise the security flag or measures discussed herein that may not be active, or it may not comprise the security flat or measures. IPv6 tunneling 300 enables IPv6 hosts 302 and 308 and routers (not pictured) to connect with other IPv6 hosts and routers over the existing IPv4 network 304. In an embodiment, tunneling may be used to provide encapsulated connectivity over an IPv4 stack to an IPv6 stack and vice versa. The encapsulated packets 306 travel from an originating host 302 that may be an IPv6 host across an IPv4 network 304 until the packets 306 reach their destination host or router 308. The IPv6 host 308 decapsulates the IPv6 datagrams. In some embodiments, e.g., when tunneling is employed for the migration, a security status of the tunnel may be determined by comparing the security status/version to a predetermined level of security or predetermined feature. In an embodiment that employs tunneling, the channel 114 is where the encapsulation occurs, as the channel 114 is located inside of the trusted security zone 110, as discussed in FIG. 1. The encapsulation process comprises the tunnel stripping the IPv6 header from the IPv6 packet 306, thus rendering the packet unsecured which is why this occurs in the trusted security zone 110.

Communications between IPv6-only hosts such as 402 and IPv4-only hosts such as may be facilitated by tunneling or dual stack, as discussed above, but may also be defined by Address Protocol Translation ("APT"), which also enables the coexistence between IPv4 and IPv6 hosts. FIG. 4 is an illustration of an APT mechanism 400. In an APT, the hosts 402 and 414 may not know anything about each other as far as IPv-versions, since the translation between the two hosts is performed in the channel 114 and the hosts will each only see a translated packet 408 or 410. It is appreciated that, since the APT translation may proceed from an IPv6 host 402 and packet 408 to an IPv4 host 414 and packet 410, or vice-versa. The translation may be employed and performed in the channel 114 even if both hosts 402 and 414 are secure. This hardware-secure encryption channel ensures that APT translations do not occur outside the channel 114, even if one or both hosts are outside of trust zones or secure environments. The channel 114 channel allows APT translations to occur in the channel 114 and then may be encrypted or encapsulated if the destination host is not located in trust and/or a secure environment prior to leaving the trusted security zone. In some embodiments, if both hosts 402 and 414 are inside trust zones or other secure environments, the translation, encryption or, encapsulation may occur inside the trust zone/secure communications channel. This allows for the establishment for a secure root of trust between hosts 402 and 414 so that the information is secured from spoofing, creating leaks in the application or device, manipulation, or hacking.

In contrast to the dual stack method 200 which may necessitate modifications or additional software to be installed for end users (hosts) for either IPv6 or IPv4-only networks, APT performs functions within a stub network and may reside within an IP router which may be located at a boundary of an IPv6 host 402 and an IPv4 host 414. Therefore, users are provided access to the IPv4-only network even if they reside on an IPv6-only network without modifying the hosts 402 of the IPv6 network (not pictured). In an embodiment, each address of a pool of IPv4 addresses are assigned IPv6 nodes as sessions are initiated by hosts 402 and 414 across the boundary of an IPv4 network 404 and an IPv6 network comprising the IPv6 host 402. An IPv6 packet 408 may be sent through the IPv4 network 404 in an IPv4 packet to form the translated IPv6 packet 406, so that an IPv4 packet 410 is ultimately received by the IPv4 host 414. In some embodiments, the reverse may occur where an IPv4 packet 410 may be sent from the IPv4 host 414 to the IPv6 host 402 over the IPv4 network 404 by translation, and may be converted to an IPv6 packet 408 and then received by the IPv6 host 402. In an embodiment, the translation table and process are managed in the trusted security zone 110, for example, by the channel 114. In an embodiment, the translation table may be stored in the trusted security zone 110 and may be specific to the network it supports and may be stored inside the trusted security zone 110. This table translates addresses received into where the request can be fulfilled inside the trusted security zone 110.

Inside the trusted security zone 110, the IPv4 host 414 can release its IPv4 address and replace it with its own private address in the IPv6 format, this connection will appear as a standard-v6-to-private-v6 connection. Subsequently, the hardware root of trust discussed above can then flow from an outside network (e.g., an IPv4 network) to an inside private network (e.g., an IPv6 network) as-is. In an embodiment, if the second/receiving hosts 402/414 are each in trust zones, the trust zone's communications channel 114 may perform the translation and will not allow the translation to occur outside of a trusted security zone.

Figure 5:
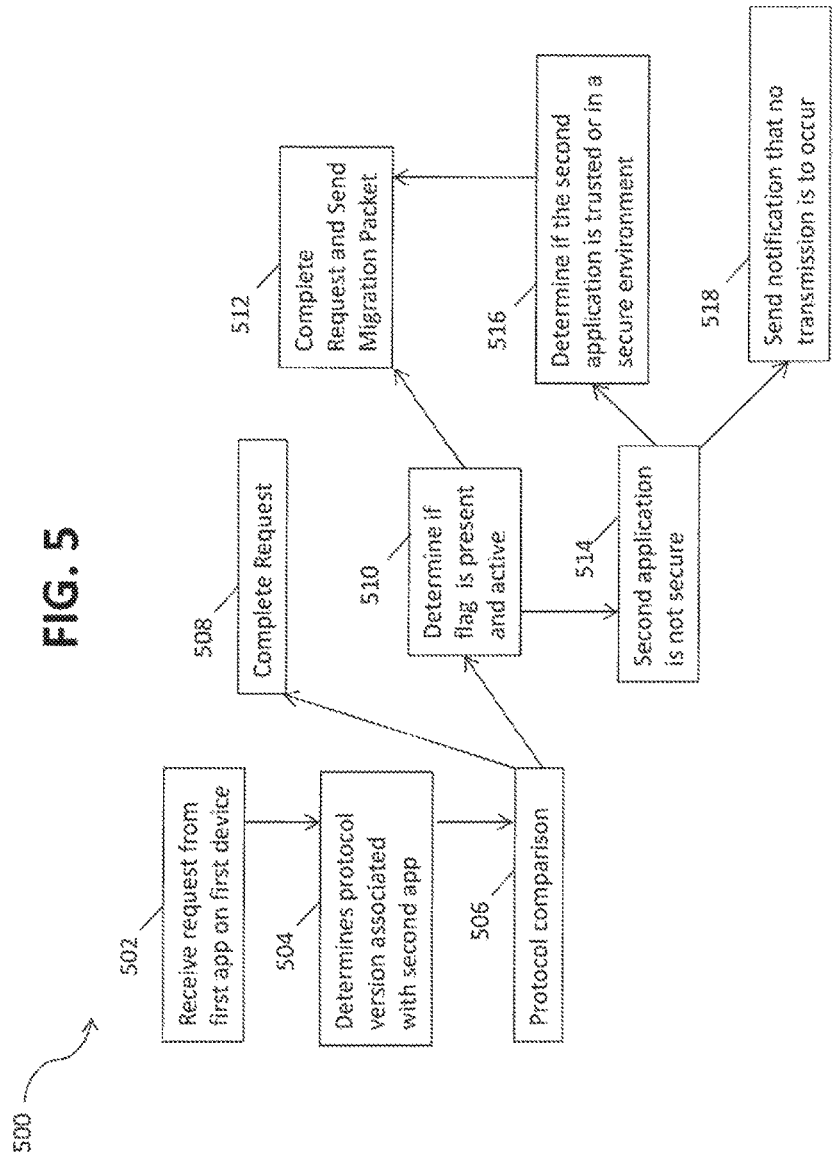
FIG. 5 is a method of sending secure communications according to embodiments of the present disclosure.

FIG. 5 is a flow chart of a method 500 of sending secure communications, which may include various types of data including communications that may be encapsulated, translated, and/or encrypted depending upon the embodiment, and in some embodiments secure communications may be sent using a communications channel 114 as discussed in FIG. 1. At block 502 in method 500, the channel 114 receives a request from a first application on a first device. The first application resides in a trusted security zone, and the request may comprise a request to send information to or receive information from a second application on a second device and the request may comprise an address that indicates a plurality of information about the first and the second applications and associated devices. The pluralities of information associated with the first and the second applications may comprise information associated with which protocols are associated with each of the first and second applications. At block 504, the channel 114 determines the version of at least one protocol associated with the second application. At block 506, the channel 114 may compare the determined protocol version to a current protocol version (IPv6) that may be, for example, associated with the first application. If, at block 504, the channel 114 determines that the protocol version associated with the second application corresponds to the IPv6 protocol, at block 508, the channel 114 may complete the request received from the first application at block 502 to exchange data with the second application. In this embodiment, there may not be a migration of an IPv6 data packet since both the origination (first application) and destination (second application) locations are associated with IPv6.

In an alternate embodiment, if at block 504 the channel 114 determines that the protocol version associated with the second application does not correspond to the IPv6 protocol, at block 510, the channel 114 may determine if the protocol version (e.g., IPv4) associated the second application comprises a flag, and if that flag is "on" or "active." In an embodiment, the flag is a security flag or protocol such as IPsec that may protect communications and protocol migration. At block 512, if the channel 114 determined at block 510 that the flag is present and on/active, the channel 114 may complete the request received from the first application at block 502 to exchange data with the second application. In an embodiment, for example, at either or both of blocks 508 or 512, there may be a token sent to the second application that may authorize communications between the first application and the second application for a predetermined amount of time, data transmission, number of communications, type of communications, or combinations thereof. This token may be used as further discussed below for authentication of the second application.

Turning back to the method 500, in an alternate embodiment at block 514, if the channel 114 determined at block 510 that the flag either was not present or was present but was not on/active, e.g., that the security feature such as IPsec was not present or active, the transfer may be determined to be a non-secure or insecure transfer. At block 516, if the transfer was determined to be an insecure transfer at block 514, the channel 114 may determine if the second application is a trusted application or if the second application resides in a secure portion of the second device. In response to a determination at block 516 either that the second application is a trusted application or that the second application resides in a secure portion of the second device (or both), the channel 114 may, at block 512, complete the request received from the first application at block 502 to exchange data with the second application. At block 518, in response to a determination at block 516 that the second application is not a trusted application and/or does not reside in a secure portion of the second device, the channel 114 may send a message to the first and/or the second application that the request will not be completed, and no IPv6 migration occurs, since there was no establishment of an end-to-end trusted communication link. This may be referred to as a notification that no transmission has or is to occur in response to the request received at block 502.

At block 512, the transfer of information from the first application to the second application (or vice versa) via the channel 114, this channel 114 acts as a barrier to data leaks that may occur during the migration process. The migration at block 512 may occur by tunneling, dual stack, or APT as discussed above, and may include encryption, encapsulation, translation, or combinations thereof depending upon the IP-version of the applications, network(s), devices, and hosts involved in the method.

In an alternate embodiment, the request received at block 502 may be analyzed by the channel 114 to determine if there is a token or other authentication mechanism associated with the second application. If there is a token or other authentication mechanism associated with the second application, it may have been previously associated with the second application or with the second device during a method such as method 500. The token may be associated with the second application and/or the second device, for example, if the protocol migration at block 512 is not successful. That is, if it is determined by the channel 114 that the second application is not associated with an IPv6 protocol but is either located in a secure environment and/or is a trusted location, or if it is determined that the IPv4 protocol has a security feature present and active. In either of those embodiments a token may be assigned to the second application. The token may be checked by the channel 114 to determine if it is valid, this determination may be made based upon whether the token is valid for a predetermined period of time, a predetermined number of exchange/communications, a predetermined type of communication (send/receive/both), a predetermined amount of data transfer (total), a predetermined amount of data transfer (per engagement/communication), or combinations thereof. Confirmation of the validity of the token may also cause the channel 114 to re-send the IPv6 protocol packet.

In alternate embodiments, the channel 114 may first determine if the second application is a trusted application and/or if it resides in a secure location on the second device prior to or simultaneously with determining if the second application comprises the current protocol, e.g., IPv6, and if the flag is present and active, and then determine (1) if migration is desired (e.g., if the second application comprises a non-current version of the protocol), (2) if the migration is to be encapsulated in the secure communications channel, (3) if the migration/communication is to be encrypted, (4) if the requested communication can be sent, and (5) if no communication or migration may take place or if an attempted communication transmission or migration was unsuccessful.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Figure 6:
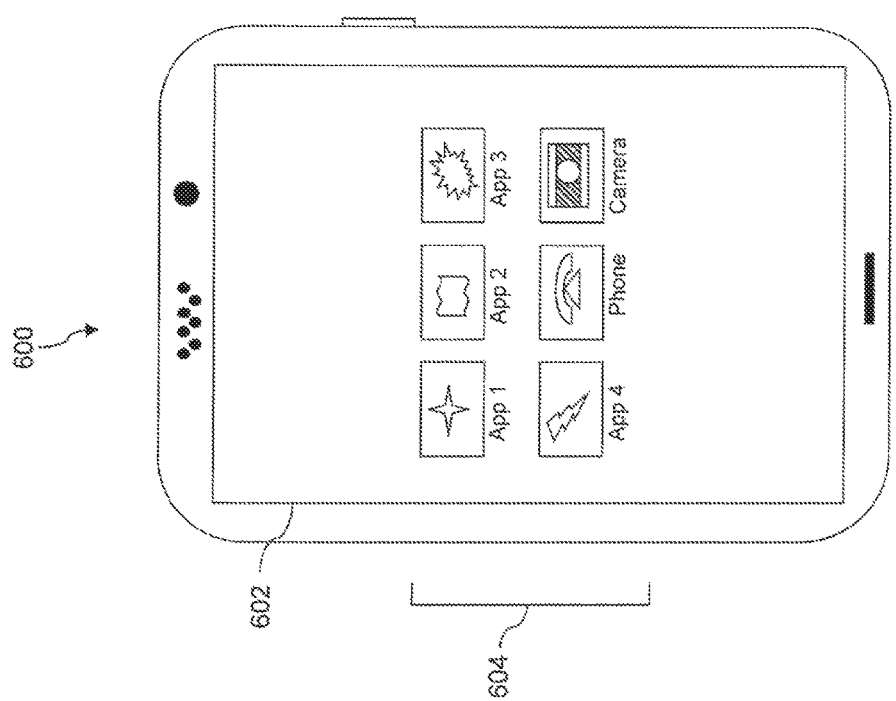
FIG. 6 depicts the user equipment (UE), which is operable for implementing embodiments of the present disclosure.

FIG. 6 depicts the user equipment (UE) 600, which is operable for implementing aspects of the present disclosure, but the present disclosure should not be limited to these implementations. Though illustrated as a mobile phone, the UE 600 may take various forms including a wireless handset, a pager, a personal digital assistant (PDA), a gaming device, or a media player. The UE 600 includes a touch-screen display 602 having a touch-sensitive surface for input by a user. A small number of application icons 604 are illustrated within the touch screen display 602. It is understood that in different embodiments, any number of application icons 604 may be presented in the touch screen display 602. In some embodiments of the UE 600, a user may be able to download and install additional applications on the UE 600, and an icon associated with such downloaded and installed applications may be added to the touch screen display 602 or to an alternative screen. The UE 600 may have other components such as electro-mechanical switches, speakers, camera lenses, microphones, input and/or output connectors, and other components as are well known in the art. The UE 600 may present options for the user to select, controls for the user to actuate, and/or cursors or other indicators for the user to direct. The UE 600 may further accept data entry from the user, including numbers to dial or various parameter values for configuring the operation of the handset. The UE 600 may further execute one or more software or firmware applications in response to user commands. These applications may configure the UE 600 to perform various customized functions in response to user interaction. Additionally, the UE 600 may be programmed and/or configured over-the-air, for example from a wireless base station, a wireless access point, or a peer UE 600. The UE 600 may execute a web browser application which enables the touch screen display 602 to show a web page. The web page may be obtained via wireless communications with a base transceiver station, a wireless network access node, a peer UE 600 or any other wireless communication network or system.

Figure 7:
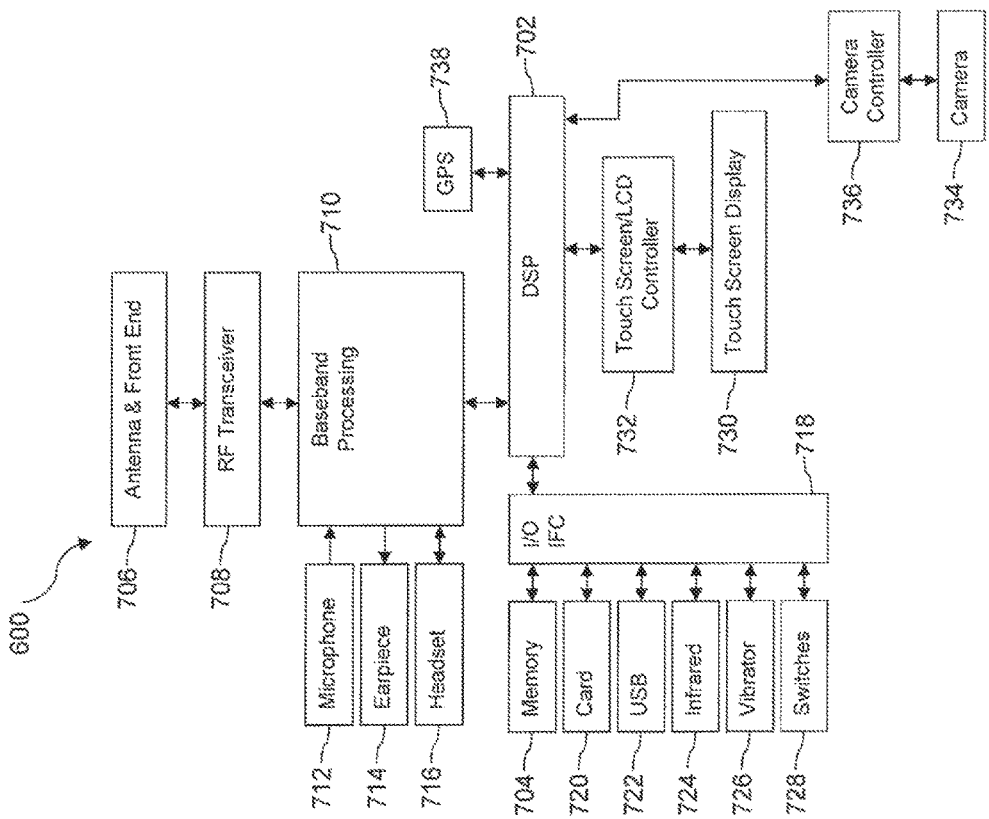
FIG. 7 shows a block diagram of a UE according to embodiments of the present disclosure.

FIG. 7 shows a block diagram of the UE 600. While a variety of known components of handsets are depicted, in an embodiment a subset of the listed components and/or additional components not listed may be included in the UE 600. The UE 600 includes a digital signal processor (DSP) 702 and a memory 704. As shown, the UE 600 may further include an antenna and front end unit 706, a radio frequency (RF) transceiver 708, a baseband processing unit 710, a microphone 712, an earpiece speaker 714, a headset port 716, an input/output interface 718, a removable memory card 720, a universal serial bus (USB) port 722, an infrared port 724, a vibrator 726, one or more electro-mechanical switches 728, a touch screen liquid crystal display (LCD) with a touch screen display 730, a touch screen/LCD controller 732, a camera 734, a camera controller 736, and a global positioning system (GPS) receiver 538. In an embodiment, the UE 600 may include another kind of display that does not provide a touch sensitive screen. In an embodiment, the UE 600 may include both the touch screen display 730 and additional display component that does not provide a touch sensitive screen. In an embodiment, the DSP 702 may communicate directly with the memory 704 without passing through the input/output interface 718. Additionally, in an embodiment, the UE 600 may comprise other peripheral devices that provide other functionality.

The DSP 702 or some other form of controller or central processing unit operates to control the various components of the UE 600 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB port 722 and the infrared port 724. The USB port 722 may enable the UE 600 to function as a peripheral device to exchange information with a personal computer or other computer system. The infrared port 724 and other optional ports such as a Bluetooth® interface or an IEEE 802.11 compliant wireless interface may enable the UE 600 to communicate wirelessly with other nearby handsets and/or wireless base stations. In an embodiment, the UE 600 may comprise a near field communication (NFC) transceiver. The NFC transceiver may be used to complete payment transactions with point-of-sale terminals or other communications exchanges. In an embodiment, the UE 600 may comprise a radio frequency identify (RFID) reader and/or writer device.

The switches 728 may couple to the DSP 702 via the input/output interface 718 to provide one mechanism for the user to provide input to the UE 600. Alternatively, one or more of the switches 728 may be coupled to a motherboard of the UE 600 and/or to components of the UE 600 via a different path (e.g., not via the input/output interface 718), for example coupled to a power control circuit (power button) of the UE 600. The touch screen display 730 is another input mechanism, which further displays text and/or graphics to the user. The touch screen LCD controller 732 couples the DSP 702 to the touch screen display 730. The GPS receiver 738 is coupled to the DSP 702 to decode global positioning system signals, thereby enabling the UE 600 to determine its position.

Figure 8A:
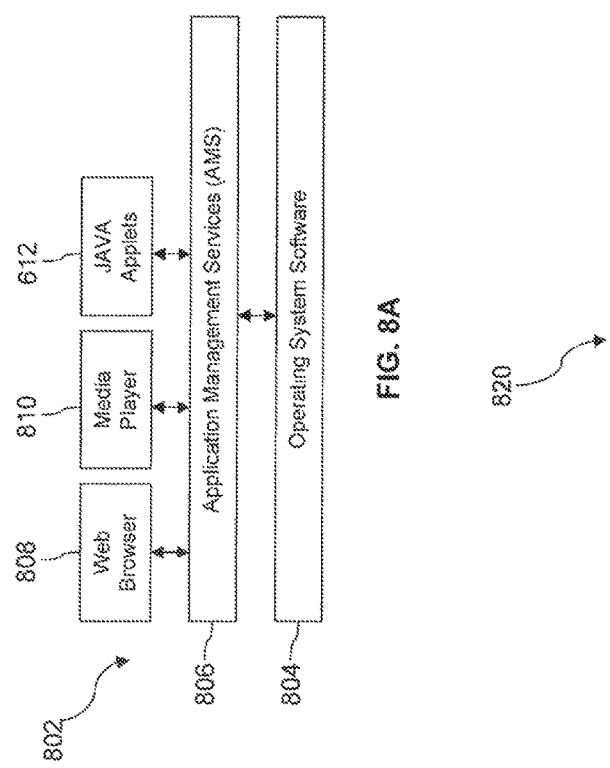
FIG. 8A illustrates a software environment that may be implemented according to embodiments of the present disclosure.

FIG. 8A illustrates a software environment 802 that may be implemented by the DSP 702. The DSP 702 executes operating system software 804 that provides a platform from which the rest of the software operates. The operating system software 804 may provide a variety of drivers for the handset hardware with standardized interfaces that are accessible to application software. The operating system software 804 may be coupled to and interact with application management services (AMS) 806 that transfer control between applications running on the UE 600. Also shown in FIG. 8A are a web browser application 808, a media player application 810, and JAVA applets 812. The web browser application 808 may be executed by the UE 600 to browse content and/or the Internet, for example when the UE 600 is coupled to a network via a wireless link. The web browser application 608 may permit a user to enter information into forms and select links to retrieve and view web pages. The media player application 810 may be executed by the UE 600 to play audio or audiovisual media. The JAVA applets 812 may be executed by the UE 600 to provide a variety of functionality including games, utilities, and other functionality.

Figure 8B:
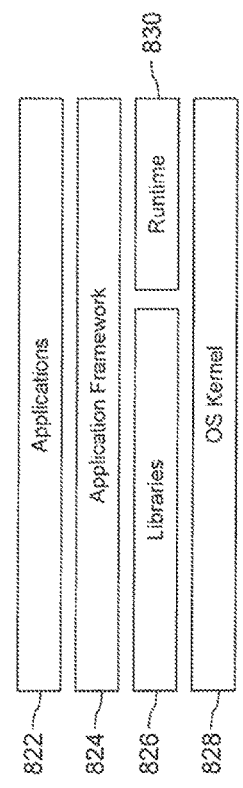
FIG. 8B illustrates an alternative software environment that may be implemented according to embodiments of the present disclosure.

FIG. 8B illustrates an alternative software environment 820 that may be implemented by the DSP 702. The DSP 702 executes operating system kernel (OS kernel) 828 and an execution runtime 830. The DSP 702 executes applications 822 that may execute in the execution runtime 830 and may rely upon services provided by the application framework 824. Applications 822 and the application framework 824 may rely upon functionality provided via the libraries 826.

Figure 9:
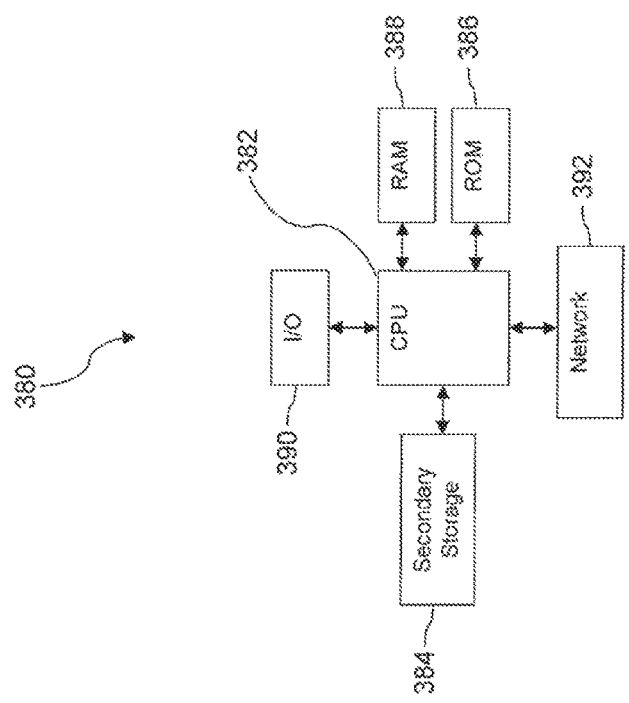
FIG. 9 illustrates a computer system suitable for implementing one or more embodiments disclosed herein.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for secure migration of IPv6 protocol packets, comprising:
    receiving, by a communication channel stored in a trusted security zone, a request from a first application to engage in an exchange of communication with a second application, wherein the first application is associated with an IPv6 protocol and the second application is associated with an IPv4 protocol;
    determining, by the communication channel, whether the second application has a security feature activated;
    in response to a determination that the second application does not have the security feature activated, determining, by the communication channel, whether the second application is a trusted application or resides in a secure environment; and
    in response to a determination that the second application is at least one of a trusted application or resides in a secure environment, migrating, by the communication channel, packet communication to the second application.

2. The method of claim 1, further comprising, in response to a determination that the second application is not a trusted application and is not stored in the secure environment of the second user equipment, sending a notification to at least one of the first application and the second application that the requested information will not be sent or received.

3. The method of claim 1, wherein migrating occurs using one of a tunneling mechanism, a dual stack mechanism, and an address/translation protocol mechanism.

4. The method of claim 3, wherein the tunneling mechanism comprises the communications channel encapsulating the IPv6 packet in an IPv4 packet.

5. The method of claim 3, wherein the address/translation protocol mechanism comprises the communications channel translating the IPv6 packet into an IPv4 packet to be received by the second application associated with the IPv4 protocol.

6. The method of claim 1, wherein migrating comprises at least one of encrypting, encapsulating, or translating the IPv6 packet to an IPv4 protocol in the communications channel.

7. A method for secure migration of IPv6 protocol packets, comprising:
　receiving, by a communication channel stored in a trusted security zone, a request from a first application, wherein the request is to engage in an exchange of communication with a second application, and wherein the first application is associated with an IPv6 protocol;
　determining, by the communication channel, if the second application is associated with an IPv6 protocol;
　in response to a determination that the second application is not associated with the IPv6 protocol, determining, by the communication channel, if the second application is associated with an IPv4 protocol and whether the IPv4 protocol comprises an active security feature; and
　in response to a determination that the second application is associated with an IPv4 protocol comprising the active security feature, sending, by the communication channel, an IPv6 protocol packet to the second application to migrate the second application to the IPv6 protocol.

8. The method of claim 7, wherein the security feature comprises IPsec.

9. The method of claim 7, wherein the first application is associated with a first user equipment, and wherein the first user equipment comprises a portable communication device, mobile phone, tablet, laptop computer, personal computer, server, or other computer system in communication with a network.

10. The method of claim 7, wherein the second application is associated with a second user equipment, and wherein the second user equipment comprises a portable communication device, mobile phone, tablet, laptop computer, personal computer, server, or other computer system in communication with a network.

11. The method of claim 7, wherein the communications channel migrates the IPv6 packet by tunneling, dual stack, or address/protocol translation.

12. The method of claim 11, wherein the migration occurs in the trusted security zone.

13. The method of claim 11, wherein the migration occurs in the communications channel in the trusted security zone.

14. A system for the secure transmission of information between IPv4 and IPv6, comprising:
　a processor;
　a non-transitory memory; and
　an application stored in a trusted security zone, wherein the trusted security zone comprises a communications channel to establish an end-to-end trusted communication link configured to:
　　receive a request from a first application, wherein the request is to engage in an exchange of communication with a second application via a network;
　　determine if the second application is associated with an IPv6 protocol;
　　in response to a determination that the second application is not associated with the IPv6 protocol, determine whether the second application is associated with an IPv4 protocol and has IPsec activated;
　　in response to a determination that the second application either is not associated with an IPv4 protocol or does not have IPsec activated, determine whether the second application is at least one of a trusted application or is stored in a secure environment; and
　　in response to at least one of a determination that the second application is associated with IPv4 protocol and comprises activated IPsec and a determination that the second application is at least one of a trusted application or is stored in the secure environment, sends an IPv6 packet to the second application via the end-to-end trusted communication link.

15. The system of claim 14, wherein the first application is associated with a first user equipment, and wherein the first user equipment comprises a portable communication device, mobile phone, tablet, laptop computer, personal computer, server, or other computer system in communication with the network.

16. The system of claim 14, wherein the second application is associated with a second user equipment, and wherein the second user equipment comprises a portable communication device, mobile phone, tablet, laptop computer, personal computer, server, or other computer system in communication with the network.

17. The system of claim 14, wherein the network comprises an IPv4 network, and wherein the communications channel encapsulates an IPv6 packet in an IPv4 packet during migration.

18. The system of claim 17, wherein, subsequent to receiving the IPv6 packet, the second application is associated with the IPv6 protocol.

19. The system of claim 14, wherein the IPv6 packet is encapsulated subsequent to receipt by the second application.

20. The system of claim 14, wherein the IPv6 packet is translated in the communications channel to an IPv4 packet and received by the second application as an IPv4 packet.

* * * * *